United States Patent [19]
Fuchs

[11] 3,914,174
[45] Oct. 21, 1975

[54] LAYER MATERIAL FOR THE RAPID CHROMATOGRAPHIC IDENTIFICATION OF FLUID SUBSTANCES, METHOD FOR THE PREPARATION THEREOF, AND USE THEREOF

[75] Inventor: Helmut Fuchs, Raich-Ried, near Tegernau, Germany

[73] Assignee: Ciba-Geigy Corporation, Ardsley, N.Y.

[22] Filed: May 4, 1973

[21] Appl. No.: 357,440

[30] Foreign Application Priority Data
May 8, 1972  Switzerland.......................... 6816/72

[52] U.S. Cl......... 210/31 C; 23/253 TP; 73/61.1 C; 210/198 C
[51] Int. Cl.²......................................... G01N 31/08
[58] Field of Search........ 73/61.1 C, 53; 23/253 TP; 210/31 C, 198 C; 356/173

[56] References Cited
UNITED STATES PATENTS

| | | | |
|---|---|---|---|
| 3,215,498 | 11/1965 | Schlitt............................ | 73/61.1 C X |
| 3,352,221 | 11/1967 | Barron et al..................... | 356/173 X |
| 3,418,152 | 12/1968 | Staudenmayer et al. ...... | 210/31 C X |
| 3,496,102 | 2/1970 | Dahl et al. ....................... | 210/31 C |
| 3,598,995 | 8/1971 | Inoue et al...................... | 210/31 C X |
| 3,667,917 | 6/1972 | Brandt.......................... | 73/61.1 C X |
| 3,791,523 | 2/1974 | Okumura et al................. | 210/198 C |

*Primary Examiner*—Richard C. Queisser
*Assistant Examiner*—Joseph W. Roskos
*Attorney, Agent, or Firm*—Harry Falber; Karl F. Jorda

[57] ABSTRACT

Layer material and method for the rapid chromatographic identification of liquid substances, yielding reproducible and distinct ring chromatograms said layer containing A. at least two dyestuffs and B. a substrate layer suitable for carrying out chromatographic tests, and wherein a. the dyestuffs are in a fine and even state of distribution and are in contact with the substrate layer, b. at least two dyestuffs yield colour rings which can be sufficiently distinguished by the eye, and c. the dyestuffs and substrate are so adjusted to each other that the entire system is able to form a ring chromatogram specific to a liquid substance which is to be identified, by depositing a small amount of a liquid to be tested for its content of the liquid substance to be identified, on a point on the said substrate layer and comparing the resulting chromatogram with one which has been obtained in similar manner with a test sample of the liquid substance to be identified.

17 Claims, 4 Drawing Figures

LAYER MATERIAL FOR THE RAPID CHROMATOGRAPHIC IDENTIFICATION OF FLUID SUBSTANCES, METHOD FOR THE PREPARATION THEREOF, AND USE THEREOF

To identify organic solvents it is necessary as a general rule to use elaborate equipment as well as time consuming or also unspecific methods.

A method of classifying unknown or novel solvents and mixtures in the eluotropic series has already been described in the Chemiker-Zeitung 82, pp. 323 to 329 (in particular p. 326, ill. 4) [1958].

According to this method, the solution of a three dyestuff mixture is deposited repeatedly in punctiform manner to an absorption layer. After the solvent has evaporated, a capillary filled with the solvent to be tested is placed on the centre of each point. The fluid which emerges diffuses radially and forms a definite, more or less distinct and characteristic ring chromatogram.

With the layer material of the present invention it is possible to identify liquid substances, in particular organic solvents, simply, rapidly, reliably, with simple, inexpensive equipment. This layer material contains A. at least two dyestuffs and
B. a substrate layer suitable for carrying out chromatographic tests, wherein
  a. the dyestuffs are in a even and fine state of distribution and in contact with the substrate layer,
  b. at least two dyestuffs yield colour rings which can be sufficiently distinguished by the eye, and
  c. the dyestuffs and the substrate are so adjusted to each other that the entire system is able to form a ring chromatogram specific to a liquid substance to be identified.

Such as coating material can be manufactured by

A. depositing or incorporating at least two dyestuffs on or into
B. a substrate layer suitable for carrying out chromatographic tests or incorporating them into this layer, the dyestuffs and substrate being so chosen and the procedure being such that
  a. the dyestuffs are in an even and fine state of distribution and in contact with the substrate layer,
  b. at least two dyestuffs yield colour rings which can be sufficiently distinguished by the eye, and
  c. the dyestuffs and the substrate are so adjusted to each other that the entire system is able to form a ring chromatogram specific to a liquid substance to be identified.

In order that the distribution of the dyestuffs on the substrate layer or in it is sufficiently fine and even it is possible to first dissolve the dyestuffs in a suitable solvent. Such solutions can contain one or more dyestuffs. If two or more dyestuff solutions are used, then these can be applied successively to the substrate or combined with each other before the application, provided that thereby the fine and even distribution is not impaired. The solutions can be distributed by impregnating or — which is generally more advantageous — by spraying the substrate layer with them.

Essentially there are two possibilities for spraying the layer with the dyestuff solutions. The one consists in spraying the solutions by using compressed air, e.g. from a device having the construction of the conventional perfume atomisers or plant spraying devices. This method can be principally recommended when the composition of the solutions must be changed frequently. However, it very often proves advisable to use compressed propellant gases. As such there may be considered, for example, compressed gases such as air or carbon dioxide or, in particular, so-called aerosol propellants (liquid petroleum gas propellants), in which connexion it is possible to use the customary known devices. In this latter case the mixture containing the dyestuff and the liquid gas propellant must be so constituted that the spraying produces droplets which are sufficiently fine in order that the required fine and homogeneous distribution can be attained on the substrate layer. Preferably such mixtures contain more than 50% of liquid gas propellant e.g. butane, isobutane, propane, dimethyl ether, trichlorofluoromethane, dichloro-difluoromethane, 1,2-dichloro, 1,1,2,2-trifluoromethane, tetrafluoromethane, and octafluorocyclobutane. In the choice of propellants the solubility of the various dyestuffs in the solvents and propellants is also to be taken into consideration. In order to attain as homogeneous a distribution as possible it is frequently advisable not to spray the required amount of a dyestuff solution all at once, but to deposit the dyestuff solution in partial amounts in several steps and accompanied in each case by an intermediate drying. Furthermore, the drying temperature and the drying time are dependent on the volatility of the solvents and on the stability of the substrate and the dyestuffs.

It is also possible to incorporate the dyestuffs in even and fine distribution into the absorbing chromatographic thin layer before the application of the thin layer to the carrier plate. In this case the dyestuffs are homogeneously distributed in the fluid suspension of the absorbent which is used for manufacturing the chromatographic thin layer. As stated at the outset, it is necessary to use combinations of such dyestuffs which produce solution colours which can be readily distinguished by the eye, and moreover, the dyestuffs must be so adapted to each other and to the substrate that the resulting system produces a characteristic and unmistakable ring chromatogram for a specific liquid substance. This happens when the dyestuffs can be dissolved in suitable solvents, when the solutions can be mixed, and when the dyestuff combination extends over the polarity range from lipophile to hydrophile in suitable gradation. The favourable conditions and the appropriate concentrations of the individual dyestuffs for the identification of a given liquid compound can be readily ascertained by means of preliminary tests. In doing so the stability of the dyestuffs towards the substrate is also to be taken into consideration.

In order that a further polarity range can be encompassed it is in general expedient to use at least one markedly hydrophilic dyestuff.

Particularly favourable combinations are as a rule those of more than two, e.g. four to six, individual dyestuffs, among them at least one group of at least two dyestuffs of similar to identical shade.

Furthermore, the dyestuffs can be selected from the most diverse classes, e.g. fat-soluble dyestuffs (Colour Index: Solvent Dyes), metal complex dyestuffs which are soluble in organic solvents (CI: Disperse Dyes), acid dyestuffs (CI: Acid Dyes), water-soluble metal complex dyestuffs (1:2 and 1:1 complexes), direct dyestuffs (CI: Direct Dyes), basic dyestuffs (CI: Basic Dyes).

Particularly satisfactory as a rule are combinations of fat-soluble dyestuffs with acid dyestuffs. The term "dyestuffs" is to be understood in this context as also comprising fluorescent compounds in the widest sense. Particular mention is to be made here of those compounds which absorb wholly or partly in the ultraviolet range and emit at least a part of the absorbed radiation in the visible sector of the spectrum, e.g. "optical brighteners" (fluorescent whitening agents) and the fluorescent dyes. These can be deposited on or incorporated into the substrate with true dyestuffs, optionally instead of them as well.

It is common knowledge that the optical brighteners also comprise hydrophilic and lipophilic representatives. As examples of such optical brighteners there may be cited the bistriazinyl-amino-stilbenedisulphonic acids which are further substituted at the triazine rings and the aminocumarins. The chromatograms produced with optical brighteners are advantageously examined under a UV lamp. As examples of fluorescent dyes there may be cited: fluorone derivatives, e.g. hydroxyphthalein, such as uranin or fluorescein, or other derivatives such as e.g. CI fluorescent brightener 74 or CI Fluorescent Brightener 155, anthraquinone derivatives such as e.g. CI Solvent Green 5, CI Solvent Green 6, CI Solvent Red 114, or CI 68410, polymethine derivatives such as e.g. CI Pigment Yellow 101, aminoaphthalimides such as e.g. CI Solvent Yellow 44, stilbene derivatives such as e.g. CI Fluorescent Brightener 48, or triarylmethane derivatives such as e.g. CI Acid Blue 110, or CI Basic Violet 1.

The amount of dyestuff on the finished layered material is preferably between 5 and 30 mg/200 cm². But it is more preferably if the layered material carries about 10 mg of dyestuff/200 cm².

The solvents in which the dyestuffs are dissolved before these latter are combined with the substrate must be miscible at least in the proportion necessary in a mixture which is to be applied. They must also naturally have an adequate dissolving power for the dyestuff or dyestuffs, which as a general rule does not give rise to any difficulties because it is in any event expedient to work with heavily diluted solutions, e.g. which contain 0.05 to 0.5% of dyestuff. Generally it is advantageous to dissolve singly the dyestuffs which are to be combined partly in polar and hydrophilic solvents and partly in non-polar and lipophilic solvents, to combine the resulting dyestuff solutions, and then to apply the mixture evenly to the substrate layer, the most satisfactory method being, as already stated, to spray the solution on. In choosing the solvent it must, moreover, be considered that the solvents have to be removed from the substrate layer by drying, for which reason mobile solvents are to be preferred. As examples there may be cited: non-polar, lipophilic solvents, e.g. xylene, toluene, tetralin, methylcyclohexane, petroleum ether, cyclohexane, dipentene; chlorinated hydrocarbons, such as carbon tetrachloride, 2,2-dichloropropane, esters, such as ethyl acetate; but in particular benzene, polar, hydrophilic solvents, e.g. ketones, such as diethyl ketone, diacetone alcohol, methylcyclohexanone, methyl ethyl ketone, cyclohexanone, acetone, cyclopentanone, ethers, such as ethylene glycol monoethyl ether, and alcohols, such as ethylene glycol monobutyl ether, diethylene glycol monobutyl ether, diethylene glycol monoethyl ether, butanol, isobutanol, pentanol, cyclohexanol, isopropanol, n-propanol, ethylene glycol, methanol, and, in particular, ethanol.

The substrate layer is for example supported on a carrier which can consist e.g. of glass plates, paper (cardboard), stainless steel, aluminium, particular plastics, such as polymethacrylate, polyvinyl chloride, polyethylene terephthalate, polyamide or polycarbonate, glass fibres or glass fabrics.

Certain substrates, such as papers from cellulose suitable for chromatography, do not require any special carrier. Moreover, the carrier can be flexible to rigid. On it there can be one or more layers of absorbent or adsorbent substances in even, fine distribution. Examples of suitable organic substances of this kind are cellulose, acetyl cellulose, polyamides, sucrose, dextrose, mannitol, charcoal, or starch. In general, however, inorganic layers are preferred, e.g. talcum, magnesium citrate, neutral sodium carbonate, potassium carbonate, calcium phosphate, calcium sulphate, magnesium carbonate, magnesium oxide, activated silica gel, diatomaceous earth, activated magnesium silicate, activated magnesium oxide, calcium oxide, fuller's earth, glass powder, salts of heteropoly acids, tungstic acid, molybdic acid and tetraboric acid, zinc carbonate and zinc ferrocyanide, aluminium silicates, combinations of two or more of these sorbents. These thin-layer chromatographic layers can also contain an impregnating agent which influences the lipophilic or hydrophilic character of the layer. These impregnating agents can be, for example, acids, bases, salts, or non-volatile hydrocarbons. The substrate layer and the carrier plate shall not be damaged by the solvents to be identified and also at the temperatures which are applied for the drying after the dyestuff solution has been deposited.

The form and size of the plate can vary. The absorbent is deposited on the carrier plate by pouring, dipping, coating or spraying a homogeneous suspension in water or in a suitable solvent, e.g. ethyl acetate, acetone, methanol, ethanol, or chloroform.

The chromatographic thin layers can further contain a binding agent or an adhesive, such as e.g. starch, gypsum, or a polyvinyl alcohol. These binding agents are incorporated into the fluid suspension of the adsorbent or can also be deposited on the carrier plate as an intermediate adhesive layer.

Particularly good results can be attained with such materials which contain on a flexible or rigid carrier, which is not capable of absorption or adsorption, a thin, homogeneous layer of silica gel of about 0.2 mm ± 0.1 mm thick. They make a particularly exact colour separation possible within a relatively short time. The chromatogram is formed in a few seconds, its diameter being normally about 5 to 25 mm, which permits on the one hand an easy interpretation by the naked eye, and on the other permits numerous individual samples to be deposited to a small surface. Also by the choice of substrate it is possible to determine particularly specific and characteristic features in the identification of liquid compounds, by which means the possibilities which exist on account of the number of available dyestuff combinations are further substantially increased. It can be of advantage if polar absorbents, such as e.g. aluminium oxide, silica gel, magnesium silicate are used for the identification of hydrophilic compounds, i.e. those with high dipole moment, and on the other hand non-polar absorbents, such as silica gel, polyamide, cellulose, saccharose, or starch are used for the identification of lipophilic compounds, i.e. those with low or no dipolar moment.

According to the invention, liquid compounds are identified by producing a ring chromatogram with these compounds on a coating material which contains A. at least two dyestuffs and B. a substrate layer suitable for carrying out chromatographic tests, wherein a. the dyestuffs are in an even and fine state of distribution and in contact with the substrate layer, b. at least two dyestuffs yield colour rings which can be sufficiently distinguished by the eye, and c. the dyestuffs and the substrate are so adjusted to each other that the entire system is able to form a specific ring chromatogram of the greatest possible colour gradation for a liquid substance to be identified, by depositing a small amount of a liquid which is to be tested for the content of the compound to be identified to a point of the same substrate layer and comparing the resulting chromatogram with one which has been obtained in similar manner with a reliable test sample of the substance to be identified. The fluid is advantageously allowed to flow from a graduated micropipette of 0.1 ml content, which permits a dosage down to 0.001 ml, in 20 to 40 seconds, to a point on the surface of the substrate layer. From this point it diffuses radially, and circular zones of different colours form through the varying migration of the dyestuffs. As in evident from the foregoing statements, for a liquid compound to be identified it is possible to establish in each case suitable dyestuff-substrate layers which produce highly specific chromatograms, so that it can be seen at once whether the sample under investigation is the presumed substance or not. For this purpose it is only necessary to produce a comparative chromatogram on the same layer in exactly the same manner with a sample which has already been identified as this substance. If the substance to be tested is not the presumed substance, then the chromatograms are so different from each other that this can be seen immediately (cf. Examples 9 to 12).

The identification process according to the present invention also makes possible the rapid identification of individual solvents which belong to a specific group, e.g. of homologues or isomers. All that is required for this purpose is a test or sample chromatogram for each member of this group (cf. Examples 5 and 6). Furthermore, it is possible to ascertain with good approximation the quantitative composition of solvent mixtures, in particular two component mixtures, e.g. ethanol/water (cf. Example 4). Sample chromatograms for different liquids can be easily preserved, so that the preparation of a comparative chromatogram is rendered superfluous. Colour photographic or, in many cases, so-called black and white reproductions of sample chromatograms can also be advantageous.

A specific dyestuff substrate composition makes possible the rapid and reliable identification of a small or large number of liquid substances. Naturally there are certain limits in this respect, so that in general it is expedient to establish different systems for identifying solvents of chemically very different constitution. With regard to the extremely high number of possible combinations it is possible, however, to find typical and reliable chromatography layers without difficulty for any kind of substances or groups of substances.

There are various possibilities available to a laboratory or a concern which desires to carry out the identification according to the invention.

1. Ready for use layer materials are available which already contain the dyestuffs. This possibility is advisable whenever frequently the same identifications have to be made. In this case it is also possible to prepare a suitable dyestuff substrate mixture and to coat a support with this mixture.

2. A particular layer material is available (or several, as the case may be) on which one or more suitable dyestuff mixtures are homogeneously distributed before use by impregnation or spraying on to the absorbent thin layer. This possibility is advisable whenever the solutions to be identified are different in kind.

These dyestuff mixtures can be in the form of one or more powders which must first be dissolved before use. For impregnating or spraying it is also possible to use one or more dyestuff solutions which contain several dyestuffs or only one.

In the following Examples which illustrate the invention the dyestuff identifications CI correspond to the particulars of the Colour Index. The percentages under "concentration" denote the number of grams in 100 ml of solution. The results noted in these examples will be better understood in view of the accompanying drawings in which FIG. 1 illustrates the ring chromatograms prepared in example 1;

EXAMPLE 1

Identification of homologous, low molecular alcohols

Figure 1:
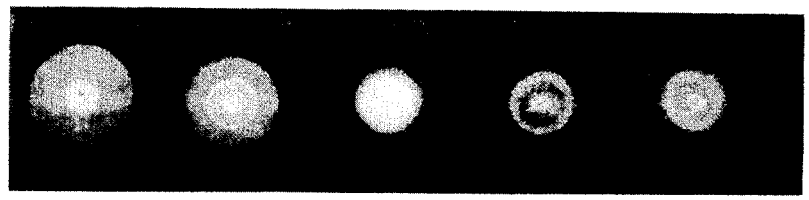
Figure 2:
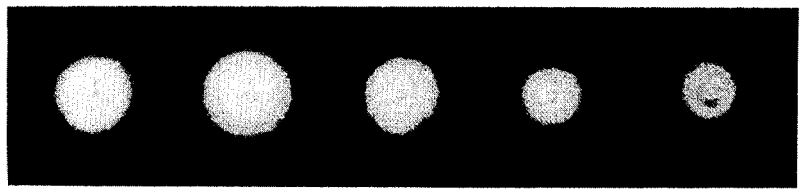
FIG. 2 illustrates the ring chromatograms prepared in example 2.
Figure 3:
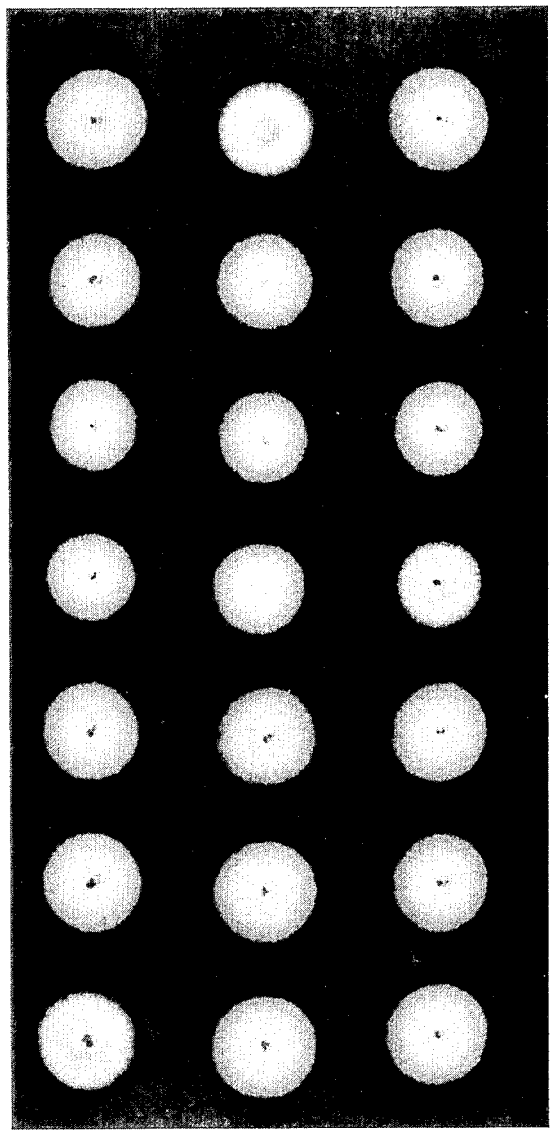
FIG. 3 illustrates the chromatographic layer prepared in example 9.
Figure 4:
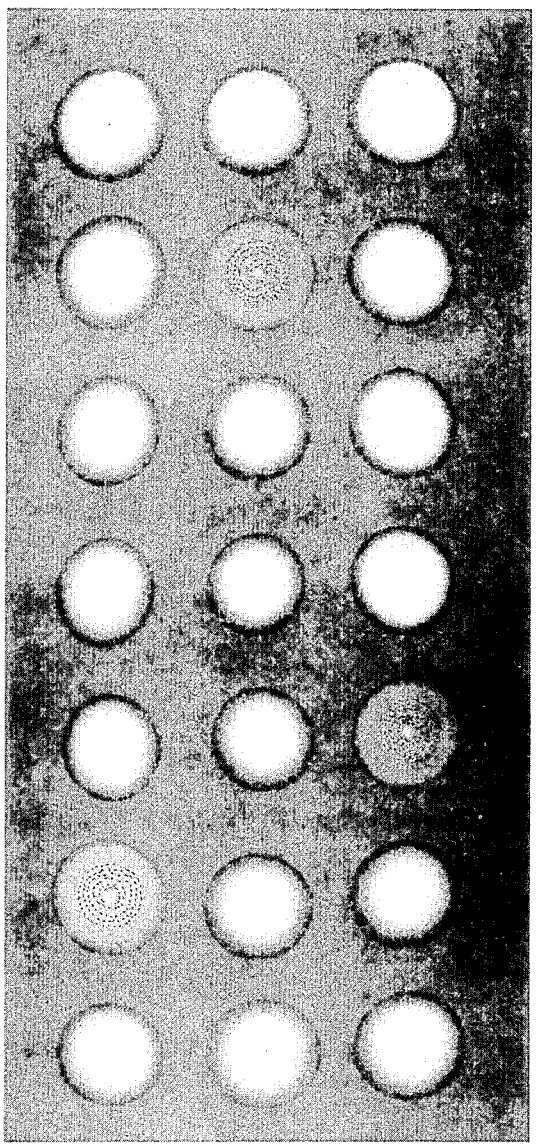
FIG. 4 illustrates the ring chromatograms prepared in example 10.

Dyestuff solutions of the following compositions are manufactured:

TABLE 1

| Dyestuff | | Solvent | Concentration | Parts by Volume |
|---|---|---|---|---|
| CI-Acid Orange | 17 | benzene | 0,1 % | 4 |
| CI-Acid Blue | 7 | ethanol | 0,1 % | 2 |
| CI-Solvent Blue | 49 | ethanol | 0,2 % | 2 |
| CI-solvent Red | 2 | benzene | 0,2 % | 5 |

The four dyestuff solutions are combined in the proportions given in the last column. Two parts by weight of the resulting solution are added to 8 parts of difluoro-trichloroethane in an aerosol container and the solution thus obtained is sprayed on to a 0.2 mm thick silica gel layer on a 200 cm² glass plate. Spraying is effected twice for 2 seconds on each occassion and accompanied by intermediate drying at room temperature, so that about 7.7 mg of dyestuff are distributed on the dyed silica gel layer. Using a graduated micropipette, 0.4 ml of each of the following alcohols is deposited at an interval of 5 cm by allowing it to flow out:

1.1 methanol
1.2 ethanol
1.3 n-propanol
1.4 n-butanol
1.5 n-pentanol

Illustration 1 is a black-white reproduction of the resulting chromatogram series. In the following chromatograms the different rings are always given in the order of the concentric rings from the outer ring to the central one.

Chromatogram 1 represents a black outer ring, a broader, deep red ring, and a circular central white zone.

Chromatogram 2 consists of a circle of narrow diameter which represents an outer black narrow ring, a broader deep red ring, a white narrow ring, a red ring, and a circular central pink zone.

Chromatogram 3 represents an outer dark green ring, a concentric, deep purplish red ring, both of which colours gradually merge with each other, and a broad, central white zone.

Chromatogram 4 represents an outer dark green ring, a concetric deep purplish red ring, both of which colours also gradually merge with each other, a narrow pale violet red ring, a broader violet ring, and a central white point.

Chromatogram 5 consists of a circle of fairly large diameter, the outer ring having a dark green colour, and the other rings are in order blue, pale violet, and a central white circle.

EXAMPLE 2

Identification of homologous, low molecular alcohols

Dyestuff solutions of the following composition are manufactured:

TABLE 2

| Dyestuff | | Solvent | Concentration | Parts by Volume |
|---|---|---|---|---|
| CI-Acid Orange | 17 | benzene | 0,1 % | 4 |
| CI-Acid Blue | 7 | ethanol | 0,1 % | 3 |
| CI-Solvent Blue | 49 | ethanol | 0,2 % | 2 |
| CI-Solvent Red | 98 | benzene | 0,2 % | 2 |

The four dyestuff solutions are combined in the proportions given in the last column. The resulting solution is sprayed in aerosol form on a silica gel layer about 0.2 mm thick on a glass carrier having an area of 200 cm$^2$, and under the sameconditions as in Example 1, in the process of which about 8.5 mg of dyestuff is evenly distributed on the silica gel layer.

The alcohols listed in Example 1 under 1.1 to 1.5 are deposited on the indicated coloured chromatographic layer under the conditions given in Example 1. Five specific ring chromatograms are obtained which in form and colour differ from those of Example 1.

EXAMPLE 3

Identification of homologous low molecular alcohols

Dyestuff solutions of the following composition are manufactured:

TABLE 3

| Dyestuff | | Solvent | Concentration | Parts by Volume |
|---|---|---|---|---|
| CI-Acid Orange | 17 | benzene | 0,1 % | 5 |
| CI-Acid Blue | 7 | ethanol | 0,1 % | 2 |
| CI-Solvent Blue | 49 | ethanol | 0,2 % | 2 |
| CI-Solvent Red | 98 | benzene | 0,2 % | 4 |

These four dyestuff solutions are combined in the proportions given in the last column.0051The resulting solution is sprayed to the same chromatographic thin layer as in Example 1 and under the same conditions.

The alcohols listed in Example 1 under 1.1 to 1.5 are deposited on this coloured chromatographic layer under the same conditions as in Example 1. Five ring chromatograms are obtained which differ slightly in form and colour from those of the preceding Example.

Examples 1 to 3 show that many dyestuff mixtures are possible for the identification according to the invention of a certain series of solvent.

EXAMPLE 4

Differentiation between absolute ethanol and specific water/ethanol mixtures

Dyestuff solutions of the following composition are manufactured:

TABLE 4

| Dyestuff | | Solvent | Concentration | Parts by Volume |
|---|---|---|---|---|
| CI-Acid Orange | 17 | benzene | 0,1 % | 3 |
| CI-Acid Blue | 7 | ethanol | 0,1 % | 4 |
| CI-Acid solvent Blue | 49 | ethanol | 0,2 % | 4 |
| CI-Solvent Red | 98 | benzene | 0,2 % | 3 |

The four dyestuff solutions are combined as described in Example 1 and sprayed on the described silica gel layer under the same conditions.

Using a graduated micropipette, 0.4 ml of each of the following solvents is deposited at 5 cm intervals over a period of 40 seconds:

4.1 absolute ethanol
4.2 absolute ethanol + 1% water
4.3 absolute ethanol + 5% water
4.4 absolute ethanol + 10% water The resulting chromatograms make it possible to differentiate between the above four solvent mixtures.

EXAMPLE 5

Identification of chlorinated hydrocarbons

Dyestuff solutions of the following composition are manufactured:

TABLE 5

| Dyestuff | | Solvent | Concentration | Parts of Volume |
|---|---|---|---|---|
| CI-Acid Orange | 17 | benzene | 0,1 % | 3 |
| CI-Acid blue | 7 | ethanol | 0,2 % | 2 |
| CI-Solvent Blue | 49 | ethanol | 0,2 % | 1 |
| CI-Solvent Red | 2 | benzene | 0,2 % | 3 |
| CI-Acid Yellow | 73 | ethanol | 0,1 % | 3 |
| CI-Solvent Yellow | 16 | benzene | 0,2 % | 3 |

The six dyestuff solutions are combined in the proportions given in the last column and sprayed on the silica gel layer described in Example 1 and under the same conditions, in the process of which about 7.3 mg of dyestuff is evenly distributed on the silica gel layer.

Using a graduated micropipette, 0.4 ml of each of the following chlorinated hydrocarbons is deposited under the same conditions as in Example 1:

5.1 1,1,2,2-tetrachloroethane
5.2 1,1,1-trichloroethane 5.3 carbon tetrachloride
5.4 chloroform
5.5 methylene chloride The chromatograms obtained with the solvents 5.1, 5.2, 5.4 and 5.5 consist in each case of an outer red ring and a central yellow circle and differ from one another principally in their dimensions, whereas the chromatogram produced by chloroform is visible merely through two slightly circular light shadings.

EXAMPLE 6

Identification of aromatic hydrocarbons

Dyestuff solutions of the following composition are manufactured:

TABLE 6

| Dyestuff | | Solvent | Concentration | Parts by Volume |
| --- | --- | --- | --- | --- |
| CI-Acid Orange | 17 | benzene | 0,1 % | 2 |
| CI-Solvent Yellow | 14 | benzene | 0,2 % | 2 |
| CI-Solvent dye 62–545 | | benzene | 0,2 % | 2 |
| CI-Solvent Red | 2 | benzene | 0,2 % | 1 |

The five dyestuff solutions are combined in the proportions given in the last column and sprayed on the silica gel layer described in Example 1 and under the same conditions, in the process of which about 9.0 mg of dyestuff is evenly distributed on the silica gel layer. The following hydrocarbons are applied to this silica gel layer under the same conditions as in Example 1:
7.1 benzene
7.2 toluene
7.3 xylene (isomer mixture)

The resulting chromatograms can be readily distinguished from one another in that the chromatogram produced with benzene has an outer dark green ring, a red ring, and a pale pink central circle, that produced with soluene has a broader outer ring and a red ring of small diameter, and that produced with xylene has a broader and still paler outer ring as well as a central red ring with still smaller diameter.

The visual comparison according to the invention makes possible a substantially more distinct classification than for example the values of the refractive indices and densities:

| | $D_4^{20}$ | $n_D^{20}$ |
| --- | --- | --- |
| benzene | 0,8787 | 1,5011 |
| toluene | 0,8669 | 1,4961 |
| xylene (isomer mixture) | 0,8630 | 1,4968 |

EXAMPLE 7

Identification of hydrophilic solvents

Dyestuff solutions of the following composition are manufactured:

TABLE 7

| Dyestuff | | Solvent | Concentration | Parts by Volume |
| --- | --- | --- | --- | --- |
| CI-Solvent Red | 98 | benzene | 0,2 % | 4 |
| CI-Acid Blue | 7 | ethanol | 0,1 % | 2 |
| CI-Solvent Blue | 49 | ethanol | 0,2 % | 2 |

TABLE 7-Continued

| Dyestuff | | Solvent | Concentration | Parts by Volume |
| --- | --- | --- | --- | --- |
| CI-Solvent Red | 2 | benzene | 0,2 % | 5 |
| CI-Acid Yellow | 73 | ethanol | 0,1 % | 5 |

The five dyestuff solutions are combined in the proportions given in the last column and sprayed on the silica gel layer described in Example 1 and under the same conditions as in Example 1, in the process of which about 9.0 mg of dyestuff is evenly distributed on the silica gel layer. Using a graduated micropipette, 0.4 ml of each of the following hydrophilic solvents is deposited under the same conditions as in Example 1:
8.1 methanol
8.2 ethanol
8.3 n-propanol
8.4 isopropanol
8.5 n- butanol
8.6 acetone
8.7 acetonitrile
8.8 ethyl acetate
8.9 dimethyl formamide
8.10 dioxan The different colours of the concentric rings are given in order from the outer to the central ring:
8.1 green, red, orange, white
8.2 green, red, orange, white
8.3 green, brown, white
8.4 green, brown, white
8.5 green, brown, pale brown, white
8.6 green, violet, white
8.7 green, cognac, pale brown, ochre yellow
8.8 green, pale brown, brown, blue
8.9 green and white (serrated border of the white part against the green)
8.10 green, brown, and blue.

EXAMPLE 8

Identification of moderately hydrophilic solvents

Dyestuff solutions of the following composition are manufactured:

TABLE 8

| Dyestuff | | Solvent | Concentration | Parts by Volume |
| --- | --- | --- | --- | --- |
| CI-Acid Orange | 17 | benzene | 0,1 % | 3 |
| CI-Acid Blue | 7 | ethanol | 0,1 % | 2 |
| CI-Solvent Blue | 49 | ethanol | 0,2 % | 1 |
| CI-Solvent Red | 2 | benzene | 0,2 % | 3 |
| CI-Acid Yellow | 73 | ethanol | 0,1 % | 3 |

The five dyestuff solutions are combined in the proportions given in the last column and sprayed on the silica gel layer described in Example 1 and under the same conditions as in Example 1, in the process of which 10.40 mg of dyestuff is even distributed on the silica gel layer.

Using a graduated micropipette, 0.4 ml of each of the following solvents is deposited under the same conditions as in Example 1:
9.1 acetone
9.2 ethyl methyl ketone
9.3 n-butanol
9.4 sec. butanol 9.5 n-pentanol
9.6 ether
9.7 petroleum ether
9.8 methylene chloride
9.9 chloroform
9.10 carbon tetrachloride Specific ring chromatograms are obtained which differ sharply in form and colour.

EXAMPLE 9

Identity test of solutions which include errors—acetone with 3 ethyl acetate errors A similar thin layer plate is used as in Example 7. Under the conditions described in Example 1, 21 test solutions (e.g. prepared from different combinations), among which are three samples with other solvents ("errors"), are deposited on this plate. These test solutions consists of acetone with 3 ethyl acetate errors. The time required for the application of the 21 solvents is about 20 minutes. Illustration 2 is a black-white reproduction of the resulting chromatogram layer on which the 3 ethyl acetate errors, which consists of an outer narrow brown ring, an inner brown ring, and a central blue circle, can be readily distinguished from the other chromatograms which consists of an outer, green narrow ring, an inner deep purplish red ring, and a central yellow ring.

EXAMPLE 10

Identity test of solutions which include errors—rectified alcohol with 3 propanol errors Under the same conditions as in Example 9, 21 test solutions consisting of rectified alcohol with 3 propanol errors are identified. The chromatograms produced with rectified alcohol show the following colour sequence on the resulting chromatogram plate: black, red, white, ochre yellow; whereas the chromatograms produced with propanol show the following colour sequence: black, brown, yellow, white, ochre yellow.

EXAMPLE 11

Identity test of 1,1,1-trichloroethane with three 1,1,2,2-tetrachloroethane errors The colour thin-layer plate described in Example 5 is used. Under the same conditions as in Example 6, 21 test solutions consisting of 1,1,1-trichloroethane with three 1,1,2,2-tetrachloroethane errors are deposited on this plate.

The ring chromatograms produced with 1,1,2,2-tetrachloroethane can be readily distinguished from those produced with 1,1,1-trichloroethane in that e.g. the diameter of the first is twice as large as the diameter of the second.

EXAMPLE 12

Identity test of absolute ethanol with three 90% ethanol solution errors

The colour thin-layer plate described in Example 4 is used. Under the same conditions as in Example 5, 21 solutions consisting of absolute ethanol with three 90% ethanol solution errors are deposited on this plate.

The resulting chromatogram plate makes a rapid identification of the 3 errors possible.

EXAMPLE 13

Identity test of proponal with 3 dioxane errors

The coloured thin layer described in Example 7 is used. Under the same conditions as in Example 7, 21 test solutions consisting of propanol with 3 dioxane errors are deposited on this plate.

The resulting chromatogram plate makes a rapid distinction of the different test solutions possible.

EXAMPLE 14

Identification comparisons of chlorinated hydrocarbons with punctiform application and even distribution of the dyestuff mixture Dyestuff solutions of the following composition are manufactured:

TABLE 9

| Dyestuff | Solvent | Concentration | Parts by Volume |
|---|---|---|---|
| CI 49 700 | benzene | 0,1 % | 1 |
| CI Solvent Red 1 | benzene | 0,1 % | 1 |
| 4-dimethylaminoazo-benzene | benzene | 0,1 % | 1 |

The four dyestuff solutions are combined in the proportions given in the last column. This resulting mixture forms the test dyestuff mixture, which is deposited as follows on 0.2 mm thick silica gel layers on 2 glass plates measuring 200 cm²:

Plate (I): punctiform application, using a micropipette, 2 microlitres of solution are deposited over a period of 30–50 seconds adjacent to each other at an interval of 45 mm and dried at room temperature.

Plate (II): spraying of the thin-layer plate: using a spray device and compressed air the plates are sprayed 5 times evenly with the test dyestuff mixture, accompanied on each occasion by intermediate drying of the plates at room temperature.

Using a micropipette, 40 microlitres of the solvents to be identified consisting of 10.1 methylene chloride
10.2 chloroform
10.3 carbon tetrachloride
10.4 trichloroethane are deposited over the course of 30–50 seconds on the dyestuff point of plate (I) and adjacent to one another at 45 mm intervals to the plate (II).

The chromatograms obtained with the punctiform application all show a yellow outer broad ring, a narrower red ring in the case of methylene chloride, chloroform and carbon tetrachloride, and at least two different brown rings and a central circular brown zone, so that they are difficult to distinguish from one another.

To the unpractised eye the identification of these chlorinated hydrocarbons is even more difficult because the reproducibility of the different ring chromatograms obtained by the punctiform method is not adequate.

On the other hand, the chromatograms obtained by the process according to the invention are readily distinguishable to anyone and can also be readily reproduced.

Methylene chloride gives an outer narrow brown ring, a broader reddish brown ring, a narrow pale ring, a narrow grey ring, and a circular central light bronw zone; chloroform gives a broad reddish brown ring, a very narrow dark brown ring, and a circular central white zone.

Carbon tetrachloride gives an almost invisible, pale circular spot, and trichloroethane gives an outer narrow black ring, a narrow red ring, and a circular broad central white zone. This comparative test shows that the process according to the invention leads surprisingly to an improved, more distinct, and more reproducible differentiation of chlorinated hydrocarbons than the ring chromatographic method known hitherto.

EXAMPLE 15

Identification comparisons of chlorinated hydrocarbons with punctiform application and even distribution of the dyestuff mixture The dyestuff solution described in Example 5 is used, which is deposited on two plates as in Example 14:
plate (III): punctiform application
plate (IV): spraying of the thin-layer plate.

The solvents 10.1 to 10.4, which are to be identified, are deposited to both plates as in Example 14.

The chromatograms obtained with the punctiform application all shown an outer narrow red ring, a broad pinkish red ring, a dark red ring, a blue ring, and a central circular green zone, so that they are almost indistinguishable from one another.

Moreover, the reproducibility of these ring chromatograms is not sufficient to make a positive differentiation of the solvents possible.

The chromatograms obtained by the method according to the invention are on the other hand readily distinguishable. Methylene chloride gives a broad outer dark claret ring, a narrower, paler claret ring, a very fine, dark claret ring, and a central circular light green zone.

Chloroform gives a relatively narrow outer dark claret ring, a paler claret ring, and a central circular light green zone.

Carbon tetrachloride gives a broad claret ring, a narrow pale claret ring, and a small, central circular light green zone. Trichloroethane gives a broad pale claret ring, and a central pale claret ring which hardly differs from this ring.

The ring chromatograms obtained by the method according to the invention also display very good reproducibility, so that the identification of the chlorinated hydrocarbons is conclusive.

EXAMPLE 16

Identification comparisons of hexane, benzene, and chlorinated hydrocarbons with punctiform application and even distribution of the dyestuff mixture The test dyestuff mixture described in Example 14 is applied on the one hand by punctiform application, and on the other by spraying, to two groups of plates:
plates (V)$_{1\ to\ 3}$: punctiform application
plates (VI)$_{1\ to\ 3}$: spraying of the thin-layer plate.
Each of the solvents to be identified
11.1 chloroform
11.2 benzene
11.3 methylene chloride
11.4 hexane
11.5 carbon tetrachloride is deposited 4 times adjacent to one another to both types of plate, as in Example 14.

The chromatograms obtained by the punctiform method with chloroform and methylene chloride are indistinguishable from each other.

Benzene, hexane, and carbon tetrachloride are also indistinguishable from one another.

The chromatograms obtained according to the invention on the other hand display very distinct differences: chloroform produces no ring chromatogram; benzene gives a very faint, pale, circular spot; methylene chloride gives a chromatogram with an outer brownish red ring, a narrow dark red ring, a narrow grey ring, and a central circular white zone; and benzene gives an outer, broader, and somewhat lighter brownish red ring, a narrow dark red ring, and a central circular light brown zone.

EXAMPLE 17

Identification of homologous, low molecular alcohols on different layered materials The dyestuff solution of Example 2 is sprayed on different commercially available chromatographic thin-layer materials:

a. polyamide layer (polyamide 11)

which is distributed evenly on an aluminium foil measuring 20 cm × 20 cm = 400 cm$^2$;

b. silica gel layer which is evenly distributed on a glass plate measuring 20 cm × 20 cm = 400 cm$^2$;

c. cellulose layer which is evenly distributed on an aluminium sheet measuring 20 cm × 20 cm = 400 cm$^2$.

The polyamide and cellulose layer are sprayed 6 times with a spray device and compressed air and the silica gel layer 4 times.

Under the conditions given in Example 1, 10 microlitres of each of the alcohols listed under 1,1 to 1.5 are deposited on coloured chromatographic layers under (a) and (c), and 40 microlitres of each of the same alcohols are deposited on the chromatographic layer (b) (cellulose).

The following ring chromatograms are obtained:

a. polyamide layer:

ethanol gives an outer, very narrow, sharply defined black ring, a broader pinkish red ring, and a circular central light blue zone.
Butanol gives an outer red ring and a circular central light blue ring.
Methanol gives an outer, very narrow, sharply defined blue ring, a broader pinkish red ring, and a circular central light blue zone.
Propanol gives an outer red ring, a light blue ring, a very narrow white ring, and a circular central light blue zone.

b. Silica gel layer:

Ethanol gives an outer, narrow, sharply defined black ring, a broader brown ring, a yellow ring, a white ring, and a circular central green zone.

Butanol gives an outer, very narrow black ring, a brown ring, a blue ring, a light blue ring, and a circular central darker zone.

Methanol gives an outer, narrow, sharply defined black ring, a narrow dark brown ring, a broad pinkish red ring, and a circular central white zone.

Propanol gives an outer, very narrow black ring, a brown ring, a very narrow pale blue ring, a broad light greenish blue ring, and a small, circular, central light green zone.

c. Cellulose layer

Ethanol gives an outer, narrow, sharply defined dark blue ring, a broad pinkish red ring, and a circular central white zone.

Butanol gives an outer, narrow, sharply defined dark brown ring, a broader brown ring, and a circular central light blue zone.

Methanol gives an outer, narrow dark blue ring, a narrow claret ring, a broad pinkish red ring, and a small, circular, central white zone.

Propanol gives an outer, narrow, sharply defined black ring, a broader brown ring, and a circular light blue zone.

These tests show that according to the present invention it is possible to identify homologous, low molecular alcohols using layer materials of different kinds.

EXAMPLE 18

Identification of homologous, low molecular alcohols which contain a dissolved solid substance Under the same conditions as in Example 18, a series of 8 chromatograms, each consisting of 6 ring chromatograms, were obtained on a silica gel layer as under (b) in Example 17 with the following solutions:

12.1 methanol
12.2 methanol+2% by weight of a α-phenyl-α-ethylglutaric imide (Doriden)
12.3 ethanol
12.4 ethanol+2% by weight of α-phenyl-α-ethylglutaric imide
12.5 propanol
12.6 propanol+2% by weight of α-phenyl-α-ethylglutaric imide
12.7 butanol
12.8 butanol + 2% by weight of α-phenyl-α-ethylglutaric imide.

It follows from this test that between the alcohols with and without 2% by weight of Doriden practically no difference in the ring chromatograms can be observed. These experiments show that the method according to the invention makes it possible to identify solvents which contain dissolved solid substances.

These comparative tests show that the layer material and method according to the present invention constitute a surprisingly clear advance in the art compared with the punctiform application of the solid dyestuff mixture known hitherto: in the punctiform application the ring formation is clearly to substantially less satisfactory both in respect of differentiating between different liquids to be tested and also in respect of reproducibility. With the known method it is in many cases not possible to distinguish different liquids reliably or to distinguish them at all, whereas the layer material of the present application yields reproducible and distinct ring chromatograms.

A considerable advance in the art is to be observed in the fact that the preparation of plates which are evenly impregnated with dyestuff (by spraying or impregnation) is much less time consuming and, in addition, yields a more unitary test material than the application of "colour spots". With specific testing the reliability is virtually 100%.

The method requires neither specially trained staff nor expensive equipment and it can be performed on the spot, i.e. where the solvent is being used and immediately before use.

The individual test or also the control of a whole series of solvent combinations requires but little time. In this respect above all the new method of identification according to the invention is far superior to other methods, e.g. the standard recording of IR spectra, in particular whenever the solvents to be identified contain dissolved solid substances.

I claim:

1. Layer material for the rapid chromatographic identification of a liquid comprising:
   A. a substrate-layer suitable for carrying out chromatographic tests, and
   B. a combination of at least two elutable dyestuffs,
      i. said dyestuff combination being in fine and even distribution on the surface or in the interior of said substrate layer,
      ii. at least two dyestuffs of said combination having different solubilities in solvents of different polarities,
      iii. at least one dyestuff of said combination being elutable through the substrate layer upon contact with the liquid to be identified, and
      iv. at least two of said eluted dyestuffs having colours after elution, which are sufficiently different from one another to be distinguished by the eye;

the substrate layer and the dyestuffs being in such relationship to one another as to enable the formation of a ring chromatogram characteristic for said liquid.

2. Layer material according to claim 1, wherein the dyestuffs (B) possess good stability on the absorbent substrate layer.

3. Layer material according to claim 1, wherein said substrate layer comprises at least one layer of a fine, evenly distributed organic absorbent substance.

4. Layer material according to claim 3, wherein said inorganic absorbent substance is selected from the group consisting of talcum, magnesium citrate, neutral sodium carbonate, potassium carbonate, calcium phosphate, calcium sulphate, magnesium carbonate, magnesium oxide, activated silica gel, diatomaceous earth, activated magnesium silicate, calcium silicate, activated aluminium oxide, activated magnesium oxide, calcium oxide, aluminium oxide, fuller's earth, glass powder, salts of heteropolyacids, tungstic acid, molybdic acid, tetraboric acid, zinc carbonate, zinc ferrocyanide, and aluminium silicates, or combinations of two or more of these sorbents.

5. Layer material according to claim 4, which comprises a silica gel layer having a thickness of about 0.2 mm ± 0.1 mm.

6. Layer material according to claim 1, wherein said organic absorbent substance is selected from the group consisting of cellulose, acetyl cellulose, polyamides, sucrose, dextrose, mannitol, charcoal, and starch.

7. Layer material according to claim 1, wherein the dyestuffs (B) are selected from the group consisting of fat-soluble dyes (Colour Index: Solvent Dyes), metal complex dyes which are soluble in organic solvents (CI: under Disperse Dyes), acid dyes (CI: Acid Dyes), water-soluble metal complex dyes (1:2 and 1:1 complexes), direct dyes (CI: Direct Dyes), and basic dyes, or compatible mixtures of at least two of said dyestuffs.

8. Layer material according to claim 7, wherein said dyestuffs (B) are at least one fat-soluble dye (Colour Index: Solvent Dyes) and at least one acid dye (CI: Acid Dyes).

9. Layer material according to claim 7, wherein the fat-soluble dyes are selected from the group consisting of dyes which are listed in the Colour Index as Solvent Blue 49, Solvent Yellow 16, Solvent Red 2, Solvent Yellow 14, CI 62545, and Solvent Red 98.

10. Layer material according to claim 7, wherein the acid dyes are selected from the group consisting of dyes which are listed in the Colour Index as Acid Blue 7, Acid Yellow 73, and Acid Orange 17.

11. Layer material according to claim 1, which also contains a binding agent.

12. Layer material according to claim 11, wherein the binding agent is starch, gypsum, or polyvinyl alcohol.

13. Layer material according to claim 1, wherein the chromatographic substrate layer (A) is supported on a carrier.

14. Layer material according to claim 13, wherein the carrier is a plate or a flexible foil.

15. Layer material according to claim 14, wherein the carrier is selected from the group consisting of stainless steel, aluminium, polymethylacrylate, polyvinyl chloride, polyethylene terephthalate, polyamide, polycarbonate, glass plate, and glass fabric.

16. Layer material according to claim 1, wherein said substrate layer comprises at least one layer of a fine, evenly distributed inorganic absorbent substance.

17. A method for rapid identification of liquids which comprises depositing an amount of said liquid to a point of a layer material comprising
   A. a substrate-layer suitable for carrying out chromatographic tests, and
   B. a combination of at least two elutable dyestuffs,
      i. said dyestuff combination being in fine and even distribution on the surface or in the interior of said substrate layer,
      ii. at least two dyestuffs of said combination having different solubilities in solvents of different polarities,
      iii. at least one dyestuff of said combination being elutable through the substrate layer upon contact with the liquid to be identified, and
      iv. at least two of said eluted dyestuffs having colours, after elution, which are sufficiently different from one another to be distinguished by the eye, the substrate layer and the dyestuffs being in such relationship to one another as to enable the formation of a ring chromatogram characteristic for said liquid, and
allowing radial diffusion from said point thereby forming concentric circular zones of different colours and different diameters through the varying migration of said dyestuffs, said concentric zones representing a ring chromatogram specific of said liquid.

* * * * *